United States Patent [19]

Hansen et al.

[11] Patent Number: 5,127,956
[45] Date of Patent: Jul. 7, 1992

[54] METHOD FOR PREPARING A MIXTURE OF SACCHARIDES

[75] Inventors: Ole C. Hansen; Rud F. Madsen, both of Nakskov, Denmark

[73] Assignee: Danisco A/S, Copenhagen, Denmark

[21] Appl. No.: 582,201

[22] PCT Filed: Mar. 22, 1989

[86] PCT No.: PCT/DK89/00065
§ 371 Date: Sep. 24, 1990
§ 102(e) Date: Sep. 24, 1990

[87] PCT Pub. No.: WO89/09288
PCT Pub. Date: Oct. 5, 1989

[30] Foreign Application Priority Data

Mar. 23, 1988 [DK] Denmark .................. 1592/88

[51] Int. Cl.$^5$ .................. C13D 3/06; C13D 1/00; C13D 3/12; C13F 3/00
[52] U.S. Cl. .................. 127/42; 127/43; 127/66; 127/55; 127/46.2
[58] Field of Search .................. 127/42, 46.2, 55, 30, 127/43, 66

[56] References Cited

U.S. PATENT DOCUMENTS

| | | | |
|---|---|---|---|
| 533,974 | 2/1896 | Wiechmann | 127/55 |
| 2,555,356 | 6/1951 | Marchand | 127/34 |
| 3,433,668 | 3/1969 | Hein | 127/66 |
| 3,816,175 | 6/1974 | Melaja | 127/30 |
| 4,138,272 | 2/1979 | Castillo et al. | 127/37 |
| 4,285,735 | 8/1981 | Mitchell et al. | 127/29 |
| 4,421,852 | 12/1983 | Hoehn et al. | 127/43 |
| 4,613,377 | 9/1986 | Yamakazi et al. | 127/39 |

FOREIGN PATENT DOCUMENTS

| | | |
|---|---|---|
| 0201676 | 11/1986 | European Pat. Off. . |
| 3211776 | 10/1982 | Fed. Rep. of Germany . |
| 3407374 | 8/1985 | Fed. Rep. of Germany . |
| 1405987 | 6/1973 | United Kingdom . |
| 2105338 | 3/1983 | United Kingdom . |
| 2179946 | 3/1987 | United Kingdom . |

OTHER PUBLICATIONS

Derwent's Abstract No. 87-305414/43, SU 603 061.
Chemical Abstracts, vol. 26 (1932), p. 5355, Food Inc. 4,66-9 (1932).
Chemical Abstracts vol. 29 (1935), p. 8387, Soviet. Sakhar 1935, No. 1,4-47.
Chemical Abstracts, vol. 50 (1956), col 13152g, Trudy Komissii Anal. Khim., Akad. Nauk. S.S.S.R., Inst. Geokhim. i Anal. Khim. 6, 492-7 (1955).
Chemical Abstracts, vol. 51 (1957), col 9813a, Zucker-Beih. 3,86-94 (1957).
Chemical Abstracts, vol. 53 (1959), col 18189c, Cukoripar 12, 126-9 (1959).

*Primary Examiner*—Theodore Morris
*Assistant Examiner*—P. L. Hailey
*Attorney, Agent, or Firm*—Oblon, Spivak, McClelland, Maier & Neustadt

[57] ABSTRACT

A method for preparing a mixture of fructose, glucose and oligosaccharides prepared from tubers or roots, and the use of the mixtures as a filler bulking agent with a sweet taste.

14 Claims, No Drawings

METHOD FOR PREPARING A MIXTURE OF SACCHARIDES

TECHNICAL FIELD

The present invention relates to a method for preparing a mixture of fructose, glucose and oligosaccharides with the general formula $GF_n$, wherein G is glucose and F is fructose and d is an integer, comprising calculated as dry matter 10-25% by weight of $G+F+GF$, 8-20% by weight of $GF_2$, 8-15% by weight of $GF_3$, and 74-40% by weight of $GF_4$ and above. The mixture is useful as a low-calorie material with sweet taste.

BACKGROUND ART

Sucrose has heretofore been widely used in confectionary and food by virtue of its excellent characteristics, such as good sweetness, body, taste and crystallinity. Sucrose, however constitutes a substrate for dextransucrase produced by intraoral microorganisms, and, as a result, consecutive intake of sucrose leads to formation of large amounts of insoluble dextran in the mouth. Thereby formation of dental plaque is accelerated. Therefore sucrose is said to possess cariogenicity. Recently there has been a trend to reduce the calorie intake for prevention of obesity and a low-calorie sweet material instead of a high-calorie one, such as sucrose, has been demanded.

For this reason many suggestions have been made as to find a sweet material for replacing sucrose, such as the artifical sweeteners saccharin, cyclamate, aspartame, sorbitol and many others.

Such alternative sweeteners are widely used but also possess several disadvantages, such as a bitter tang or aftertaste. Furthermore, some of the artificial sweeteners are suspected to be carcinogenic.

These disadvantages, especially the suspicion of being carcinogenic - a recurrent subject in the public debate have made consumers reluctant to use products containing any type of artificial sweetener.

It is known that the Dahlia tubers contain a polysaccharide known as inulin. According to Merck Index, 10th edition, Merck & Co. Inc., Rahway, N.J., U S A, 1983, p 725, Index no. 4872, it has the formula $GF_n$ with n being of an average value of approx. 37. The preparation of inulin from dahlia tubers is disclosed in U.S. Pat. No. 4,285,735.

It is also known that chicory roots and Jerusalem artichoke tubers contain corresponding polysaccharides or oligosaccharides with the general formula $GF_n$. The value of n varies depending on the raw plant material in question, cf. e.g. S. E. Fleming et al., *Preparation of high-fructose syrup from the tuber of the Jerusalem artichoke (Helianthus tuberosus L.)*. CRC Crit. Rev. Food Sci. Nutr., 11, 1.23, 1979, U.S. Pat. No. 4,613,377 and EP patent application no. 0 201 676/A2.

The interest in these polysaccharides and oligosaccharides in form of inulin or inulin-like compounds (inulides) has until now been directed to the large content of fructose moities in said compounds. They are thus a useful source for the preparation of fructose, especially with regard to using the fructose as nutrient replenisher and sweetener.

EP patent application 0 201 676 discloses a method for preparing a low-glucose cleavage product from plant parts said cleavage product comprising inulin-like oligo- or polysaccharides. According to this method the extracted oligo- or polysaccharides are subjected to treatment with the enzyme inulinase in order to decompose them to fructose and fructose-oligomers.

U.S. Pat. No. 4,613,377 discloses a method where the inulin-like oligosaccharides obtained from Jerusalem artichoke tubers or chicory roots, are subjected to partial or substantially complete hydrolysis.

Further prior art disclosing the general state of the art comprises the following.

GB-PS no. 1.405.987 discloses the preparation of a mixture of fructose and glucose, i.e. invert sugar, by crystallization.

U.S. Pat. No. 2,555,356 discloses the preparation of inulin from Jerusalem artichoke. The inulin obtained is used as a substitute for starch and for the preparation of levulose and alcohol.

U.S. Pat. No. 4,138,272 discloses a method for the preparation of fructose from xerophyte plants, for example Agave.

DE-OS 3.211.776 discloses a method for obtaining juice from Jerusalem artichoke to be used for the preparation of hydrocarbons, for example acetone butanol.

Derwent's abstract no. 87 305.414/43, SU patent application 306.061 (SU.PS 1.300.032) discloses the preparation of fructose from Jerusalem artichoke.

Non-patent literature concerning the analyses of "inulin" from Jerusalem artichoke is mentioned in Chemical Abstracts (CA), vol. 26, (1932), p. 5355, Food Ind. 4, 66-9(1932);

CA, vol. 29, (1935), p. 8387, Sovet. Sakhar 1935, No. 1, 4-47;

CA, vol. 50, (1956), col. 13152 g Trudy Komissii Anal. Khim., Akad. Nauk. S.S.S.R., Inst. Geokhim. i Anal. Khim. 6, 492-7(1955);

CA, vol. 51, (1957), col. 9813 a, Zucker-Beih. 3, 86-94(1957);

CA, col 53, (1959), col. 18189 c, Cukoripar 12, 126-9(1959).

From the British patent applications nos. 2.072.679, 2.105.338 and 2.179.946 a low-calorie sweet material is known comprising a mixture of oligosaccharides with 1-4 molecules fructose bound to sucrose, i.e. a mixture of the oligosaccharides $GF_2$, $GF_3$, $GF_4$ and $GF_5$. The above mixture is prepared by stepwise synthesis from sucrose letting the enzyme fructosyl transferase act upon sucrose:

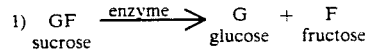

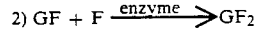

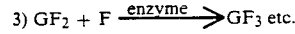

This synthesis is expensive and yields only small amounts of the oligosaccharides $GF_4$ and $GF_5$. Moreover, the above reaction 1) results in the production of an excess of glucose. The known sweet material is available under the name "Neosugar", both in form of a syrup and in powder form. "Neosugar" does not possess the detrimental effects of sucrose or alternative artificial sweeteners mentioned above, its preparation is, however, too expensive to allow wide use thereof. Furthermore, consumers are probably reluctant to use the product if presented as a chemically modified product.

There is thus still a need for a method allowing the preparation of a sweetener on the basis of a natural product without the detrimental effects of sucrose and conventional alternative sweeteners, said method being inexpensive and not involving chemical modification of the desired natural components in the starting materials.

DISCLOSURE OF THE INVENTION

It has now been found, that a material in form of a mixture of saccharides satisfying these needs can be prepared from a natural raw material, i.e. plant tubers or roots, e.g. tubers of the Jerusalem artichoke, *Helianthus tube-rosus L*, or roots of chicory, *Cichorium*.

Accordingly the present invention relates to a method for preparing the above mixture of saccharides characterized by recovering said mixture from plant tubers or roots by means of a process which does not involve any chemical modification of the components of the mixture.

By using the method according to the invention it is possible to prepare the mixutre of saccharides in form of a dry powder at a price of less than half the costs involved in the preparation of the product known from GB patent application no. 2.072.679 according to the methods disclosed in GB patent applications no. 2.072.679, 2.105.338 and 2.179.946.

The composition of the product prepared by the method according to the invention differs from the composition of inulin derived from dahlia tubers by having a lower degree of polymerisation. Thus the ratio F/G is 3-4 for the product prepared by the method according to the invention as compared to inulin where the ratio F/G is approx. 30.

An essential requirement for any material used as sweet material is its water solubility. The product prepared according to the invention has a composition or degree of polymerisation within such limits that, on the one hand, the constituents are sufficiently large to pass predominantly undigested through the alimentary tract On the other hand, the constituents are still water soluble. The inulin product obtained from dahlia tubers is not soluble in water in its unmodifiad form, and has thus to be subjected to chemical or other modification, such as hydrolysis, if a water-soluble product is desired.

An especially preferred product prepared according to the invention comprises 25-35% by weight $G+F+GF+GF_2$ and 75-65% by weight $GF_3$ and above calculated as dry matter. Such a product comprises an especially satisfactory combination of sweetening effect, water solubility and indigestibility.

The product is obtained from plant tubers or roots, preferably tubers, of Jerusalem artichoke (Helianthus tuberosus L.) or roots of chicory because these plants give a high yield of the mixture with the desired composition. When the Jerusalem artichoke is culivated in a temperate climate the tubers harvested during the major part of the harvesting season result in an mixture with the desired composition. In order to standardize the product, however, it may be desirable in some cases to remove less soluble compounds, e.g. compounds of the formula $GF_n$, wherein n is above approx. 8, and/or low-molecular compounds using conventional methods Such a separation is not necessary for plants harvested during most of the harvesting season.

The product is advantageously prepared in form of a dry powder, thus enabling an easier handling and a more stable product. It is, however, also possible to use the mixture in form of a juice or syrup especially for industrial use, when shipment in large amounts, e.g. in a tank, directly to the user is possible and convenient. In this case the problems mentioned below in connection with the removal of the remaining water are avoided.

The product can be prepared from Jerusalem artichoke tubers or roots of chicory by first preparing a syrup, i.e. a concentrated solution with a dry matter content of between 65 and 80% by weight. The syrup is then evaporated further and dried until the desired powdery product is obtained.

Syrup from Jerusalem artichoke tubers or roots of chicory can be prepared in a manner resembling conventionally used methods for the preparation of sucrose syrup from sugar beets. It is thus possible to perform this part of the production with a conventional sugar beet plant This is advantageous in that the capacity of existing plants is considerably larger than is demanded on the world market. It is thus possible to use the free capacity for the preparation of the product.

Syrup from Jerusalem artichoke tubers or roots of chicory is prepared as follows Stones, green parts and soil are removed from Jerusalem artichoke tubers or roots of chicory and the tubers or roots are cut into cosettes. These are extracted with water in a so-called DDS-diffusor, i.e. a trough with a steam mantle. The trough has a small inclination and is provided with a twin screw for the transport of the cosettes counter to the flow of water. The extraction is performed at 60°-85° C. and the desired product is transferred to water in dissolved form. Part of the protein content is denaturated, thus rendering it insoluble. Enzymes present in the solution are also de. naturated and thus inactivated so that they cannot decompose the desired product. The aqueous extract has a dry matter content of 10-17% by weight.

Impurities, such as pectin, proteins and cell material, are removed from the extract by adding slaked lime, $Ca(OH)_2$, up to a pH-value of 10.5-11.5. After adding the slaked lime the following alternatives are open:
1. separation followed by adjusting the pH value by adding $CO_2$ or phosphoric acid and subsequent separation, or
2. adding $CO_2$ or phosphoric acid and subsequent separation, i e the extract is only separated once.

In a further embodiment the extract is treated with slaked lime in two steps, i.e. it is subjected to a pre-treatment and to a main treatment with the slaked lime. Then $CO_2$ is added followed by separation. Then $CO_2$ is added again followed by separation The above separation steps can for example be carried out by filtration.

Salts and colours are removed by means of ion exchange. Residues of colours and undesired taste and odoriferous compounds are removed by subsequent treatment with active carbon.

The purified extract with a dry matter content of 8-14% by weight can be subjected to hyperfiltration (reverse osmosis) in order to remove water up to a dry matter content of approx. 25-30% by weight. In a multi-step evaporator, such as a falling film evaporator, the extract is subsequently concentrated to a syrup with a dry matter content of 75-85% by weight.

This syrup is further evaporated to a dry matter content of 91-96% by weight by means of evaporation e.g. in a vertical vacuum dryer or a thin film evaporator.

On the basis of such a syrup the mixture is prepared in form of a dry powder by using two alternative methods i.e. one termed "drying with quenching" and one termed "vacuum flash drying". These methods are generally suitable for the concentration of syrup-like materials, and are subject matter of the concurrent patent applications, DK patent applications no. 1593/88 and no. 1594/88 respectively.

The invention relates further to a method for preparing the mixture in form of a dry powder. Such a dry powder is bacteriologically stable. High osmotic pressure is required for obtaining bacteriological stability. For the relatively high-molecular oligosaccharides a high osmotic pressure is first obtained at a high dry matter content. A liquid product with a sufficiently high dry matter content is difficult to handle in the preparation step as well as during the application of the product, as it has an almost paste-like consistency resembling soft toffee mass, i.e. such a product flows very slowly without solidifying and is very sticky. As mentioned above, however, it is possible to use the mixture in form of a juice or syrup if the above problems are of no importance, e.g. in case of industrial use in large amounts.

It is often difficult to remove the remaining water when preparing products, such as sugars, including mono- and oligosaccharides, and similar sensitive as well as hygroscopic products in dry form, such as in powder form. This is particularly true for the mixture in question.

One of the reasons is the high content of compounds with hydrophilic groups in the mixture, rendering the product hygroscopic.

Another reason is the tendency of the mixture to form supersaturated solutions making it difficult to precipitate and isolate a solid product.

Supersaturated and other concentrated solutions are very often highly viscous Consequently they are difficult to work with and have the tendency to stick to the apparatus.

All these properties further impede the removal of water, e.g. by evaporation or drying, since problems arise during the heating of the material. An equal distribution of heat is, for example, not ensured, thus risking local overheating. During the heating the material can be destroyed or deteriorate e.g. by burning, caramelisation, or another form of decomposition.

Several methods for drying products in order to remove the remaining water are known, such as spray drying, drum drying, freeze drying, flash drying and microwave vacuum drying.

For spray drying, the solution to be dried is fed into a chamber in form of tiny drops. The falling drops are dried by means of hot air so that the drops are transformed into a dry powder before they reach the bottom of the chamber. Spray drying cannot be used, if the solution has the tendency to remain liquid, either as a supersaturated solution or in form of a melt, during the drying process, where the temperature is usually above 60° C., since the material accumulates on the walls of the spray drying chamber.

Drum drying is normally performed at temperatures about 100° C. At this temperature many materials occur in form of a melt and can thus not be transformed into a solid product. During drum drying the product accumulates on the warm surfaces, causing overheating with subsequent destruction or deterioration of the material.

With conventional flash drying water is removed almost instantaneously from wet, solid particles, said particles being dispersed in a warm stream of gas at a high velocity. At flash drying the temperature of the drying air is above 100° C., rendering this drying method unsuitable for drying heat-sensitive products.

It is evident that neither spray drying drum drying nor flash drying are suitable for the preparation of the mixture in form of a dry powder.

The only known methods possibly suitable for drying the mixture to a dry powder are freeze drying and microwave vacuum drying. These methods are, however, expensive, since their operational costs are high especially with regard to energy consumption and capital costs.

The German Offenlegungsschrift 3 407.374 discloses a method for preparing dried products from sucrose syrup. According to this method the pre-concentrated sucrose syrup with a dry matter content of at least 70% is heated for a short period, such as below 60 sec, to a very high temperature, and the warm material is expanded to a concentrated syrup with a dry matter content of at least 90%. This syrup is transformed to a dry, pourable product by sudden cooling and subsequent release of the remaining water during crystallization.

This method is limited to easily crystallizable materials with a positive crystallization enthalpy, i.e. materials crystallizing during cooling. The mixture does not crystallize under such conditions and the known method is consequently unusable.

Since none of the known methods except the cost-intensive freeze-drying and microwave vacuum drying is usable for drying of the mixture to a dry powder, it has been necessary to find such methods.

Two such methods have thus been provided in form of the above "drying with quenching" and "vacuum flash drying" methods.

The starting syrup for the "drying with quenching"-method is pre-evaporated to a dry matter content of 94-96% by weight e.g. in a vertical vacuum dryer, which is a vessel with steam mantle and stirrer connected to vacuum. The evaporated syrup has a temperature of 80° to 100° C. and is still liquid. It can almost be regarded as a melt. This melt is then subjected to quenching by transferring said melt in a thin layer to a cooling drum or a cooling belt. The drum or belt has a temperature of below 0° C., preferably between minus 10° and 0° C.

The melt solidifies to form a glass-like mass and does not solidify, unlike sucrose syrup, in crystalline form. The glass-like material is scraped off the cooling surface in form of flakes. These flakes are roughly ground (granulated) and dried to a dry matter content of above 96% by weight in a conventional powder dryer, e.g. in a fluidized bed, at a temperature of below 60° C.

The final product is subsequently ground to the desired grain size.

For vacuum flash drying the syrup with a dry matter content of 91-96% by weight and a temperature of 80°-100° C. is transferred to a vacuum chamber. By adjusting the dry matter content and the temperature of the syrup before the transfer and by adjusting the vacuum of the chamber the obtained product has a temperature of 30°-40° C. after the evaporation of the water and is solid.

It is unnecessary to add further heat during the drying process, since the heat of evaporation is derived from the enthalpy of the syrup.

During the evaporation of water in a vacuum chamber the material is cooled down to a temperature slightly above the temperature where the vapour pressure of water corresponds to the absolute pressure in the vacuum chamber. This is due to boiling point elevation. The vapour pressure of water at 22°, 25°, 30°, 35° and 38° C. is 19.8, 23.8, 31.8, 42.2, and 49.7 mmHg respectively. At an absolute pressure of 23.8 mmHg the cold and dry product leaves the vacuum chamber having a temperature of approx. 30° C., while an absolute pressure of 42.2 mmHg results in a temperature of approx. 40° C.

The process can be described as a flash-like evaporation in vacuum, the feed being a syrup and the final product a dry powder.

The process takes place in vacuum thus rendering it unnecessary to overheat the syrup, said syrup being a solution and not a wet, particulate matter.

As a result of the removal of evaporation heat the product is obtained with a temperature of 30°–40° C. without external cooling.

The dry product obtained by one of the above methods is useful as a mixture partially or completely substituted for sugar and other sweet materials including sorbitol.

The inventive method for the preparation of the mixture in form of a dry powder is characterized in that the following steps are carried out:

(a) the substantially cleaned tubers or roots are cut into cosettes,
(b) the cosettes are subjected to extraction with water,
(c) the extract, or juice, is treated in a suitable order one or more times by each of the following steps:
   (1) addition of $Ca(OH)_2$,
   (2) addition of $CO_2$ or phosphoric acid, and
   (3) separation,
(d) the juice from step (c) is subjected to ion exchange,
(e) the juice from step (d) is optionally treated with active carbon,
(f) the juice from step (e) is optionally concentrated by hyperfiltration,
(g) the juice from step (d), (e) or (f) is evaporated to a syrup with a dry matter content of 91-96% by weight,
(h) the syrup is dried and ground to a powder.

For overcoming the difficulties during the evaporation of the high concentrated syrup, step (h) is advantageously carried out by one of the following methods, i.e. either (i) the syrup is distributed as a thin layer on a cooling surface with a temperature of below 0° C., preferably between minus 10° C. and 0° C., whereby the syrup solidifies to a hard glass-like mass,
(k) the hard glass-like mass formed in step (i) is scraped off the cooling surface in form of flakes,
(l) the flakes are roughly ground and
(m) the roughly ground flakes are dried at a temperature of below 60° C. to a dry matter content of above 96% by weight, preferably above 97% by weight,
(n) the temperature of the syrup is adjusted to a value below the boiling point of said syrup at atmospheric pressure,
(o) the syrup is fed into a vacuum chamber,
(p) the syrup is led through the vacuum chamber without any heat supply to the syrup,
(q) the obtained dried or evaporated product is removed from the vacuum chamber through an air lock.

It is possible to use the mixture as a juice, only the above steps (a)-(f) is carried out. Then the juice can be evaporated to a syrup if desired. In this way the problems of removing the remaining water are avoided.

It is especially advantageous to perform step (b) as a continuous, countercurrent extraction, since a good yield of the mixture is thus obtained.

An especially good yield is obtained when the extraction is performed at a temperature of 60°–85° C.

A further improvement of the yield is obtained when a press juice is pressed from the extracted cosettes and returned to the extraction process.

A purer and better product, which is easier to evaporate, is obtained, if cellulose, hemicellulose, pectin and other undesirable, high-molecular materials are removed during the treatment of the juice at a suitable moment subsequent to step (b) and before (d). This can be carried out by removing the undesired materials by means of treatment with one or more enzymes or by means of ultrafiltration. It may be desirable to perform a partial desalination, e.g. by means of an "open" hyperfiltration membrane, such as HC50 available from DDS Filtration, DK-4900 Nakskov.

A suitable enzyme for the above-mentioned enzyme treatment is SP249, a non-commercial enzyme available from NOVO, Copenhagen, Denmark.

In order to obtain a sufficiently concentrated syrup to be used as starting material in "drying with quenching" or "vacuum flash drying" it is advantageous to perform step (g) by evaporation in a falling film evaporator to a dry matter content of approx. 85% by weight and subsequent evaporation in a vertical vacuum dryer or a thin film evaporator.

The product prepared according to the invention is suitable for the preparation of low-calorie human or animal foodstuffs or beverages by incorporating the product in the foodstuff or beverage.

Examples for products where the mixture is usable include chewing gum, chocolate, ice cream, liquorice, cakes, all types of biscuits, canned food, marmelade and jams, lemonade and various other foodstuffs.

The mixture obtained by the inventive method has a sweetening effect, corresponding to 0.3–0.6× the one of sucrose, without possessing any tang or aftertaste. Such a sweetening effect being lower than that of sucrose is advantageously employed in products where a large amount of sweetener is desirable with regard to body and texture. Examples of such products are liquorice and certain types of chocolate. The same amount of sucrose would render such products oversweet. The mixture passes the alimentary tract predominantly without being digested thus providing the organism with a very low amount of calories. The mixture increases the rate with which the food passes the alimentary tract, thus reducing the overall intake of calories. Said mixture thus acts as a filler or bulking agent in the alimentary tract in the same way as dietary fibers, i.e. it increases the fecal excretion of sterols and volatile fatty acids and lowers the serum level of cholesterol and triacylglycerol. Furthermore the mixture supports the growth of bacteria of the genus Bifidobacterium and other favorable microorganisms of the natural intestinal flora. Moreover, it has been found that this type of mixture has no laxative effects, even when given in an amount of 1 g/kg body weight/day. This has been established by a blind test performed with 20 individuals, where a mixture according to Example 3 was compared with sorbitol and PALATINITR PALATINITR is a calorie reduced sugar substitute available from Palatinit SuBungsmittel GmbH, Wormser Str 8, D.6719 Obrigheim/Pfalz.

Due to the above beneficial effects on the gastrointestinal tract it is also possible to use the mixture as a pharmaceutical preparation for the improvement of the intestinal function. Such preparations can be in form of conventional formulations, e.g. as tablets, dragees, capsules and the like. In case of microorganisms able to utilize the mixture as a carbohydrate source, the mixture can also be used in nutritive media for the cultivation of such microorganisms.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BEST MODE FOR CARRYING OUT THE INVENTION

The preparation of the product and examples for its use are described below in greater detail in the following examples.

Example 1

Preparation of a syrup

The harvested tubers of the Jerusalem artichoke are treated on a conventional plant for treating sugar beets. The treatment includes the following steps.

1. Feeding and removal of stones and grass

The tubers are emptied into a beet yard and flow into the plant, while stones as well as green plant material (i.e. grass and stem material) are removed. Most of the soil is also washed off.

2. Cutting

For preparing the tubers for the subsequent extraction process said tubers are cut into cosettes with a cross-section of approx. 0.5×0.5 cm. Their length depends on the size of the tubers (typically 2-5 cm). The cutting process is performed on a conventional sugar beet cutter. It can, however, be necessary to use other knives.

3. Extraction

In order to extract the desired product from the cosettes, the extraction process is performed analogous to the one known from the extraction of sugar from sugar beets. The extraction is performed in a so-called DDS-diffusor, a trough with a steam mantle. The trough has a small inclination and is provided with a twin screw ensuring transport of the cosettes.

The cosettes are extracted according to the counterflow principle, i.e. the cosettes are fed through a funnel in the bottom part of the trough. Water as well as the press juice obtained in step 4 are fed into the top part of the trough.

The cosettes are then transported counter to the flow of water, whereby oligosaccharides and other water-soluble components, such as salts and proteins, pass into the water phase.

The temperature during the extraction is between 60°-85° C. Such a high temperature ensures not only a good solubility of oligosaccharides but also partially denaturates the protein as to render it insoluble. Enzymes are also denaturated and thus inactivated at this temperature.

The dry matter content of the extract is 10-17% by weight.

4. Pressing of the pulp

The extracted cosettes are pressed in a special press of the type also used for conventional sugar beet processing. This is done to increase both the yield of oligosaccharides as well as the dry matter content of the pulp. The pulp has often to be dried with respect to stability during transport and storage until use, e.g. in form of foodstuffs. The increase in yield is achieved by transferring the press juice back to the extraction process, as described above.

5. Purification of the juice

The juice obtained by the extraction process is turbid since it contains particulate and colloidal material. Amongst the impurities present are pectin and proteins as well as cell material from the cosettes.

In order to remove these impurities slaked lime Ca(OH)$_2$ is added up to a pH-value of 10.5-11.5 thereby precipitating a part of the impurities.

The pH-value is lowered again by adding $CO_2$ or phosphoric acid either before or after filtration. Thus excess calcium is precipitated either as calcium carbonate or calcium phosphate. The pH-value after this treatment is between 8.0 and 9.5. The juice is subsequently filtered. The temperature during the lime treatment is 35°-40° C., and during the lowering of the pH-value and the filtering it is 60°-80° C. Precipitation and filtering are improved at the higher temperature.

The purification of the juice is performed using the same equipment as in conventional sugar beet processing.

After the purification the dry matter content is 9-16% by weight.

6. Ion exchange

After the purification the juice still contains salts (3-8% by weight of the total dry matter) and it is brownish or greenish in colour. It is thus subjected to a cation as well as an anion exchange.

The cation exchange (e.g. on a "Duolite®"-C20 resin) is performed at a temperature of 25°-35° C. in order to avoid hydrolysis of the oligosaccharides.

During the anion exchange (e.g. on a "Duolite®" A.378 resin) the coloured compounds of the juice are also removed as to render said juice a colourless oligosaccharide solution. The dry matter content after the ion exchange is 8-14% by weight.

7. Treatment with active carbon

It may be necessary to treat the ion-exchanged juice with active carbon in order to remove possible residues of coloured compounds, undesired taste or odoriferous compounds.

8. Evaporation

Before the actual evaporation it is advantageous to employ hyperfiltration (reverse osmosis) in order to remove part of the water so that the dry matter content is up to approx. 25% by weight. By this step a more gentle treatment is obtained.

The evaporation is performed in a multi-step evaporator such as a falling film evaporator. The juice is evaporated to a syrup of a dry matter content of between 75-85% by weight.

Thereafter the syrup is evaporated in a vertical vacuum dryer to a dry matter content of 91-96% by weight.

Example 2

Tubers of Jerusalem artichoke are treated as described in Example 1 under the following conditions. The extraction temperature is 70° C. The dry matter content of the extracted juice is 12% by weight Ca-$(OH)_2$ is added at 35° C. to pH 11.5 and the pH value is then lowered to 9 by adding $CO_2$. Then the juice is filtered at 60° C. After ion exchange at 25° C. on "Duolite®" C20 and "Duolite®" A.378 and treatment with active carbon the juice has a dry matter content of 9% by weight due to dilution during ion exchange. The juice is hyperfiltrated to a dry matter content of 25% by weight, and then evaporated first in a falling film evaporator to 85% by weight and then to 92.6% by weight in a thin film evaporator (model LUWA, available from Buss-SMS, Kaiserstr. 13-15, D.6308 Butzbach).

Examples 3-14:

Preparation of a mixture in the form of a dry powder

METHOD 1: "DRYING WITH QUENCHING"

Example 3

A syrup is used having a dry matter content of 94.3% by weight obtained according to the method of Example 1 being of a temperature of 90° C., at which temperature the syrup is liquid.

The syrup, almost representing a melt, is transferred to the outer surface of a cooling drum in form of a thin layer. The temperature on the surface of the cooling drum is minus 8° C.

The syrup solidifies to form a glass-like mass and does not form crystals, as conventional sugar solutions do.

The hard, glass-like material is scraped off the cooling drum in form of flakes. These flakes are roughly ground (granulated) and subsequently dried in a fluid bed dryer at a temperature of below 60° C. to a dry matter content of 96.2% by weight.

The material can subsequently be ground to a desired grain size, such as below 250 μm.

Example 4

A syrup is used having a dry matter content of 95.8% by weight obtained according to the method of Example 1 being of a temperature of 90° C., at which temperature the syrup is liquid.

The syrup, almost representing a melt, is transferred to a cooling drum in form of a thin layer. The temperature on the surface of the cooling drum is minus 8° C.

The syrup solidifies to form a glass-like mass, which is scraped off the cooling drum in form of flakes. These flakes are roughly ground (granulated) and subsequently dried in a fluid bed dryer at a temperature of below 60° C. to a dry matter content of 97.5% by weight.

Thereafter the material is ground to a grain size of below 250 μm.

Example 5

A syrup is used having a dry matter content of 92.2% by weight obtained according to the method of Example 1 being of a temperature of 96° C., at which temperature the syrup is liquid.

The syrup, almost representing a melt, is transferred to a cooling drum in form of a thin layer. The temperature on the surface of the cooling drum is minus 10° C.

The syrup solidifies to form a glass-like mass, which is scraped off the cooling drum in form of flakes. These flakes are roughly ground (granulated) and subsequently dried in a fluid bed dryer at a temperature of below 60° C. to a dry matter content of 96.5% by weight.

Thereafter the material is ground to a grain size of below 250 μm.

Example 6

A syrup is used having a dry matter content of 95.0% by weight obtained according to the method of Example 1 being of a temperature of 94° C., at which temperature the syrup is liquid.

The syrup, almost representing a melt, is transferred to a moving cooling belt in form of a thin layer. The temperature on the surface of the moving cooling belt is minus 5° C.

The syrup solidifies to form a glass-like mass, which is scraped off the moving cooling belt in form of flakes. These flakes are roughly ground (granulated) and subsequently dried in a fluid bed dryer at a temperature of below 60° C. to a dry matter content of 97% by weight.

Thereafter the material is ground to a grain size of below 250 μm.

METHOD 2: "VACUUM FLASH DRYING"

Example 7

A syrup having a dry matter content of 91-93% by weight obtained according to the method of Example 1 and being of a temperature of 80°-100° C. is transferred to a vacuum chamber provided with a conveyor belt.

By adjusting the dry matter content and the temperature of the feeding material as well as the vacuum in the chamber the obtained product has a temperature of 30°-40° C. after evaporation of water and is solid. The heat of evaporation is derived from the enthalpy of the feeding material, i.e. it is not necessary to add heat during the drying process.

At an absolute pressure of 23.8 or 42.2 mmHg the product leaves the vacuum chamber at a temperature of approx. 30° C. or approx. 40° C. respectively.

The process can be described as a flash-like evaporation in vacuum, the feed being a syrup and the final product a dry powder.

The above process differs from conventional flash evaporation by being performed in vacuum, thus rendering it unnecessary to overheat the feeding material, and by the feeding material being a solution and not a wet, particulate matter.

An interesting property of this drying method is the fact that the product is cooled to a desired final temperature of typically 30°-40° C. during the drying/water evaporation.

Example 8

The general procedure described in Example 7 is carried out in a vacuum chamber provided with a self-cleaning twin screw. In this way a final dry powder product similar to the product obtained in Example 7 is obtained.

Example 9

The general procedure described in Example 7 is carried out in a vacuum chamber with free fall. In this way a final dry powder product similar to the product obtained in Example 7 is obtained.

Example 10

A syrup having a dry matter content of 91% by weight and a temperature of 95° C. obtained according to Example 1 is fed into a vacuum chamber provided with a conveyor belt. The absolute pressure in the vacuum chamber is 25 mm Hg. The dry powder leaving the chamber has a dry matter content of 96% by weight and a temperature of 31° C.

Example 11

A syrup having a dry matter content of 93% by weight and a temperature of 95° C. obtained according to Example 1 is fed into a vacuum chamber provided with a conveyor belt. The absolute pressure in the vacuum chamber is 39 mm Hg. The dry powder leaving the chamber has a dry matter content of 98% by weight and a temperature of 39° C.

Example 12

A syrup having a dry matter content of 92% by weight and a temperature of 85° C. obtained according to Example 1 is fed into a vacuum chamber provided with a conveyor belt. The absolute pressure in the vacuum chamber is 30 mm Hg. The dry powder leaving the chamber has a dry matter content of 95.8% by weight and a temperature of 35° C.

Example 13

A syrup having a dry matter content of 91% by weight and a temperature of 99° C. obtained according to Example 1 is fed into a vacuum chamber provided with a self-cleaning twin screw. The absolute pressure in the vacuum chamber is 30 mm Hg. The dry powder leaving the chamber has a dry matter content of 96.5% by weight and a temperature of 35° C.

Example 14

Roots of chicory are treated as described in Example 1 under the following condition. The extraction temperature is 75° C. The dry matter content of the extracted juice is 13% by weight. $Ca(OH)_2$ is added at 35° C. to pH 11.0 and the pH value is then lowered to 9 by adding $CO_2$. Then the juice is filtered at 70° C. After ion exchange at 25° C. on "Duolite ®" C20 and "Duolite ®" A.378 and treatment with active carbon the juice has a dry matter content of 9.5% by weight due to dilution during ion exchange. The juice is hyperfiltrated to a dry matter content of 25% by weight, and then evaporated first in a falling film evaporator to 85% by weight and then to 92 3% by weight in a thin film evaporator (model LUWA, available from Buss SMS, Kaiserstr 13-15, D.6308 Butzbach). The obtained syrup is adjusted to 98° C. and is fed into a vacuum chamber with free fall. The absolute pressure in the vacuum chamber is 38 mmHg. The dry powder leaving the chamber has a dry matter content of 97% by weight and a temperature of 38 5° C.

Example 15

The product prepared as described in Example 3 as well as the commercially available products "Neosugar"-syrup and "Neosugar"-powder have, according to an analysis, the following composition, cf. Table 1. All analysis results of the carbohydrates are given in relation to the dry matter content. All values in Table 1 are in % by weight.

TABLE 1

|  | "Neosugar-" syrup | "Neosugar" powder | Product acc. to. Ex. 3 |
|---|---|---|---|
| dry matter | 79.0 | 96.4 | 96.2 |
| ash | 0 | 0 | 0 |
| glucose | 29.5 | 1.1 | 1.3 |
| fructose | 1.7 | 0.8 | 1.9 |
| sucrose | 10.6 | 2.8 | 15.8 |
| $GF_2$ | 28.0 | 36.4 | 12.9 |
| $GF_3$ | 30.2 | 58.9 | 11.1 |
| $GF_n$* | 0 | 0 | 57.0 |

*$n \geq 4$

On the basis of the experimental results with respect to "Neosugar" described in an article of T. Tokunaga et al., J. Nutr. Sci. Vitaminol., 32, 111-121, 1986, it is evident, that the laxative effect of the compounds of the general formula $GF_n$, where $n > 2$, is more extensive at a lower molecular weight.

It has thus to be assumed that the product according to Example 3 is less laxative than "Neosugar".

The most laxative component is presumably $GF_2$. The content of this component in "Neosugar" is 28.0% and 36.4% respectively whereas there is only 10.8% in the product of Example 3.

Example 16

Chewing gum

The sugar content in a conventional chewing gum was replaced by a combination of the mixture prepared according to Example 3 and aspartame. It was found that this chewing gum possessed better organoleptic properties, especially with regard to "mouthfeel" or texture and rest volume, i.e. the volume left after chewing of a chewinggum for a predetermined period of time, than corresponding chewing gums comprising sucrose.

Example 17

Sweets

Sweets with the following basic formulation, wherein 33% of the sucrose are replaced by the mixture of Example 3 were prepared.

Basic formulation:
200 g sucrose,
100 g mixture of Example 3,
120 g glucose,
100 g water, The basic formulation is boiled down while heating to 170° C.

The basic formulation is subsequently cooled and flavourings are added just before the formulation can no longer be kneaded. Amongst the flavourings used are peppermint oil, aniseed oil, eucalyptus oil or others.

After the kneading in of the flavourings the resulting formulation is cut into the desired form and is left to stiffen.

The sweets prepared according to this method are slightly less sweet and have a lower calorie content than conventional sweets.

Example 18

Cake formulation

In this formulation 20% of the sucrose content were replaced by the mixture of Example 3. The following recipy was used:

|  | Regular cake formulation | Formulation with mixture of Example 3 |
|---|---|---|
| margarine | 250 g | 250 g |
| flour | 250 g | 250 g |
| sugar (sucrose) | 200 g | 160 g |
| mixture of Example 3 | — | 40 g |
| eggs | 6 | 6 |

The cakes were both baked for 1.25 h at 150° C. in a circulating air oven. The results were as follows. There was no difference during the preparation of the dough. After the baking there was a small difference in colour, the cake formulation comprising the mixture of Example 3 being somewhat darker. Both cakes tasted alike.

Example 19

Semi-sweet chocolate

|  | Regular formulation | Formulation with mixture of Example 3 |
|---|---|---|
| sugar (sucrose) | 48.0% | 24.0% |
| mixture of Example 3 | — | 24.0% |
| cocoa mass | 45.0% | 45.0% |
| cocoa butter | 6.5% | 6.5% |
| lecithin | 0.5% | 0.5% |
|  | 100.0% | 100.0% |

The only difference between the above types of chocolate are that the one comprising the mixture of Example 3 is lower in calories and less sweet.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of preparing a mixture of fructose, glucose, and oligosaccharides with the general formula $GF_n$, wherein G is glucose and F is fructose and n is an integer, comprising calculated as dry matter
   10-25% by weight of $G+F+GF$,
   8-20% by weight of $GF_2$,
   8-15% by weight of $GF_3$, and
   74-40% by weight of $GF_4$ and above
   and wherein the value of n satisfies the condition that the F/G ratio of the mixture is 4 or below, characterized by recovering said mixture from a member of the group consisting of tubers or Jerusalem artichoke (Helianthus tuberosus L.), and roots of chicory (Cichorium) by means of a process, which does not involve any chemical modification of the desired natural components of the starting materials, by which method the following steps are carried out:
   (a) the substantially cleaned tubers or roots are cut into cosettes,
   (b) the cosettes are subjected to extraction with water,
   (c) the extract, or juice, is treated in a suitable order one or more times by each of the following purification steps:
      (1) addition of $Ca(OH)_2$ to a pH value of 10.5-11.5
      (2) addition of $CO_2$ or phosphoric acid to a pH value of 8.0-9.5, and
      (3) separation
   (d) the juice from step (c) is subjected to ion exchange,
   (e) the juice from step (d) is optionally treated with active carbon,
   whereafter the juice is optionally further concentrated by subjecting the juice to hyperfiltration and/or evaporation and/or drying.

2. A method as claimed in claim 1, for the preparation of a substantially dry powder, characterized by the following steps being carried out:
   (a) the substantially cleaned tubers or roots are cut into cosettes,
   (b) the cosettes are subjected to extraction with water,
   (c) the extract, or juice, is treated in a suitable order one or more times by each of the following steps:
      (1) addition of $Ca(OH)_2$,
      (2) addition of $CO_2$ or phosphoric acid, and
      (3) separation
   (d) the juice from step (c) is subjected to ion exchange,
   (e) the juice from step (d) is optionally treated with active carbon
   (f) the juice from step (e) is optionally concentrated by hyperfiltration,
   (g) the juice from step (d), (e) or (f) is evaporated to a syrup with a dry matter content of 91-96% by weight,
   (h) the syrup is dryed and ground to a powder.

3. A method as claimed in claim 2, characterized in that step (g) is performed by means of evaporation in a falling film evaporator to a dry matter content of approx. 85% by weight and subsequent evaporation in a thin film evaporator.

4. A method as claimed in claim 1, characterized in that step (h) involves the following steps:
   (i) the syrup is distributed as a thin layer on a cooling surface with a temperature of below 0° C., preferably between minus 10° C., and 0° C., whereby the syrup solidifies to a hard glass-like mass,
   (k) the hard glass-like mass formed in step (i) is scraped off the cooling surface in form of flakes,
   (l) the flakes are roughly ground and
   (m) the roughly ground flakes are dried at a temperature of below 60° C. to a dry matter content of above 96% by weight, preferably above 97% by weight.

5. A method as claimed in claim 1, characterized in that step (h) involves the following steps:
   (n) the temperature of the syrup is adjusted to a value below the boiling point of said syrup at atmospheric pressure,
   (o) the syrup is fed into a vacuum chamber,
   (p) the syrup is led through the vacuum chamber without any heat supply to the syrup,
   (q) the obtained dried or evaporated product is removed from the vacuum chamber through an air lock.

6. A method as claimed in claim 1 for the preparation of a juice or syrup characterized by the following steps being carried out:
 (a) the substantially cleaned tubers or roots are cut into cosettes,
 (b) the cosettes are subjected to extraction with water,
 (c) the extract, or juice, is treated in a suitable order one or more times by each of the following steps: (1) addition of $Ca(OH)_2$, (2) addition of $CO_2$ or phosphoric acid, and (3) separation,
 (d) the juice from step (c) is subjected to ion exchange,
 (e) the juice from step (d) is optionally treated with active carbon,
 (f) the juice from step (e) is optionally concentrated by hyperfiltration,
 (r) the juice from step (e) or (f) is optionally evaporated to a syrup.

7. A method as in claim 1, characterized by step (b) being carried out by means of continuous countercurrent extraction.

8. A method as in claim 7, characterized by the extraction being performed at 60°-85° C.

9. A method as in claim 1, characterized by a press juice being pressed from the extracted cosettes and returned to the extraction process.

10. A method as in claim 1, characterized by cellulose, hemicellulose, pectin and other undesirable high-molecular materials being removed during the treatment of the juice, at any suitable moment subsequent to step (b) and before step (d).

11. A method as claimed in claim 10, characterized in that the undesirable materials are removed by means of treatment with one or more enzymes.

12. A method as claimed in claim 10, characterized in that the undesirable materials are removed by means of ultrafiltration.

13. A method for the preparation of a low-calorie, human or animal foodstuff or beverage characterized in incorporating into the foodstuff or beverage a mixture recovered according to claim 1.

14. A mixture of fructose, glucose and dioligosaccharides of the general formula $GF_n$, wherein G is glucose and F is fructose and n is an integer, comprising calculated as dry matter
 10-25% by weight of G+F+GF,
 8-20% by weight of $GF_2$,
 8-15% by weight of $GF_3$, and
 74-40% by weight of $GF_4$ and above,
and wherein the F/G ration is on or below 4 recovered by the method as claimed in claim 1.

* * * * *